US011025921B1

(12) United States Patent
Stahl

(10) Patent No.: US 11,025,921 B1
(45) Date of Patent: Jun. 1, 2021

(54) PROVIDING A VIRTUAL VIEW BY STREAMING SERIALIZED DATA

(71) Applicant: Apple Inc., Cupertino, CA (US)

(72) Inventor: Geoffrey Stahl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/713,379

(22) Filed: Sep. 22, 2017

Related U.S. Application Data

(60) Provisional application No. 62/398,415, filed on Sep. 22, 2016, provisional application No. 62/398,425, filed on Sep. 22, 2016.

(51) Int. Cl.
*H04N 19/17* (2014.01)
*H04N 5/232* (2006.01)
(Continued)

(52) U.S. Cl.
CPC ........... *H04N 19/17* (2014.11); *G06T 19/006* (2013.01); *H04N 5/23238* (2013.01); *H04N 19/167* (2014.11)

(58) Field of Classification Search
CPC ........... H04N 21/4781; H04N 21/6587; H04N 21/4788; H04N 21/2343; H04N 21/4532; H04N 21/4622; H04N 21/2665; H04N 21/4312; H04N 21/4438; H04N 21/812; H04N 21/21805; H04N 21/482; H04N 21/4858; H04N 21/2365; H04N 21/25875; H04N 21/440272; H04N 21/454; H04N 21/4753; H04N 21/4786; H04N 21/6125; H04N 5/45; H04N 7/106; H04N 21/41407; H04N 19/107; H04N 19/132; H04N 19/61; H04N 19/172; H04N 19/436; H04N 21/2381; H04N 7/17318; H04N 19/166; H04N 21/2143; H04N 21/2187; H04N 21/234363; H04N 21/422; H04N 21/47205; H04N 19/146; H04N 1/00307; H04N 2101/00; H04N 21/2402; H04N 21/4126; H04N 21/4223; H04N 21/4316; H04N 21/43637; H04N 21/44008; H04N 21/47; H04N 21/47202; H04N 21/4821; H04N 21/6377; H04N 21/658; H04N 2201/3225; H04N 2201/3278; H04N 7/157; H04N 9/8205; H04N 19/14; H04N 19/169; H04N 19/176; H04N 19/188; H04N 21/23; H04N 21/23412; H04N 21/23418; H04N 21/2358; H04N 21/23805; H04N 21/25825; H04N 21/2668; H04N 21/4113; H04N 21/4143;
(Continued)

(56) References Cited

U.S. PATENT DOCUMENTS

| 7,102,666 | B2 | 9/2006 | Kanade | |
|---|---|---|---|---|
| 9,445,081 | B1 | 9/2016 | Kouperman | |
| 2010/0309973 | A1* | 12/2010 | Chien | ................ H04N 21/2662 375/240.02 |
| 2012/0115598 | A1 | 5/2012 | Hagstrom | |

(Continued)

*Primary Examiner* — Dave Czekaj
*Assistant Examiner* — Samuel D Fereja
(74) *Attorney, Agent, or Firm* — Blank Rome LLP

(57) ABSTRACT

Streaming image data includes receiving a request for a video stream of a scene of a live event, generate a background portion of the scene, obtaining a model of an object in the scene, transmitting the background portion and the model of the object, generating a serialized data stream indicating a modification of the object from the model, and transmitting the serialized data stream for the object.

21 Claims, 4 Drawing Sheets

(51) Int. Cl.
*H04N 19/167* (2014.01)
*G06T 19/00* (2011.01)

(58) Field of Classification Search
CPC ....... H04N 21/4358; H04N 21/440263; H04N 21/4668; H04N 21/47208; H04N 21/4755; H04N 21/478; H04N 21/47815; H04N 21/4782; H04N 21/6405; H04N 21/64322; H04N 21/8358; H04N 21/8543; H04N 21/8583; H04N 21/8586; H04N 2201/3274; H04N 5/23219; H04N 5/23238; H04N 13/243; H04N 13/271; H04N 19/137; H04N 19/152; H04N 19/159; H04N 19/46; H04N 1/32101; H04N 1/32144; H04N 1/32203; H04N 2005/91335; H04N 2013/0081; H04N 21/21; H04N 21/233; H04N 21/2387; H04N 21/23892; H04N 21/25; H04N 21/25883
See application file for complete search history.

(56) References Cited

U.S. PATENT DOCUMENTS

| | | |
|---|---|---|
| 2015/0055937 A1 | 2/2015 | Van Hoff |
| 2015/0128162 A1* | 5/2015 | Ionescu ................ G06Q 30/00 725/14 |
| 2015/0145887 A1 | 5/2015 | Forutanpour |
| 2015/0215600 A1 | 7/2015 | Norkin |
| 2015/0221096 A1* | 8/2015 | Gefen .................... G06T 7/292 382/103 |
| 2015/0245013 A1 | 8/2015 | Venkataraman |
| 2016/0065864 A1* | 3/2016 | Guissin ................ G06T 5/008 348/239 |
| 2016/0180590 A1 | 6/2016 | Kamhi |
| 2016/0255282 A1 | 9/2016 | Bostick |
| 2016/0381398 A1 | 12/2016 | Saxena |
| 2017/0061314 A1* | 3/2017 | Schnurr ........... H04N 21/23418 |
| 2017/0094259 A1 | 3/2017 | Kouperman |
| 2018/0213203 A1 | 7/2018 | Miyashita |
| 2018/0232943 A1 | 8/2018 | Shikata |
| 2018/0246631 A1 | 8/2018 | Maruyama |

* cited by examiner

PROVIDING A VIRTUAL VIEW BY STREAMING SERIALIZED DATA

BACKGROUND

This disclosure relates generally to the field of digital image processing, and more specifically to the field of providing a virtual view by streaming serialized data.

A user's ability view live events has improved significantly with the rise in technology. For example, in sporting events, venues are often outfitted with numerous cameras and sensors, which allows for improved user interaction with the game. TV cameras throughout the venue provide numerous views. Spidercams allow cameras to pan vertically and horizontally over a playing field. These various cameras provide an enhanced user experience for people watching a game either at home, or in the venue itself. That is, the television feed of the game often incorporates replays from alternative camera views between plays or during timeouts. In addition, a user within the venue may often view an alternate view or replay on display screens within the venue. However, these types of video may require a large bandwidth to stream to a user.

SUMMARY

In one embodiment, a method for streaming image data is described. A method for streaming image data includes receiving a request for a video stream of a scene, generate a background portion of the scene, obtaining a model of an object in the scene, transmitting the background portion and the model of the object, generating a serialized data stream indicating a modification of the object from the model, and transmitting the serialized data stream for the object.

In another embodiment, the method may be embodied in computer executable program code and stored in a non-transitory storage device. In yet another embodiment, the method may be implemented in an electronic device having image capture capabilities.

DETAILED DESCRIPTION

Figure 1:
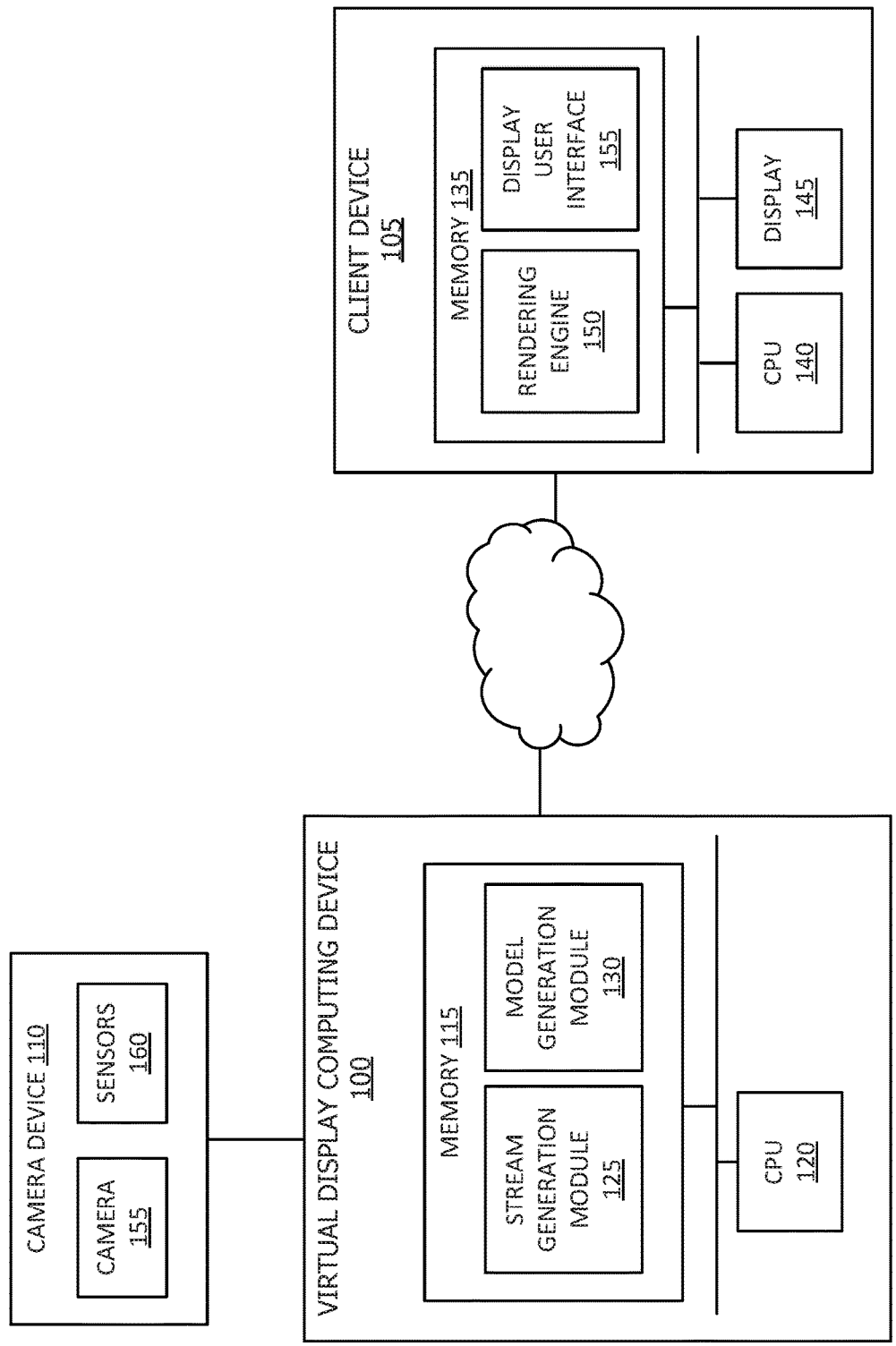
FIG. 1 shows, in block diagram form, a diagram for a system of devices providing a virtual view of a scene, according to one or more embodiments.

This disclosure is directed to systems, methods, and computer readable media for providing a virtual view by streaming serialized data. According to one or more embodiments, a background and model of a moving object may be transmitted to a user device, along with artwork for the model, and other data. The user device may receive a serialized data stream indicating the movements of the model. Then, the user device may render the video stream on the user device using the background artwork model of the object, and movements of the model. In one or more embodiments, the result is a smaller data stream because the background artwork is not being constantly transmitted. That is, in one or more embodiments, only the changes to the scene are transmitted, and the scene is rendered at the user end. As an example, if a user is streaming a sports event, the field, or background, often does not change. All that changes is the movement of the players and the ball. Thus, the background may be transmitted much less often than the players. Further, a central device may only transmit models of the players, and then transmit updates to the movement of the players as a serialized data stream. The user device may then render the display using the background art, the model of the moving object, and the received movements of the object.

In addition, in one or more embodiments, the serialized data stream may be used to transmit other data a user may request as ancillary information. Returning to the example of the sporting event, if a user is streaming a football game, the user may request statistics about the game. In one or more embodiments, the serialized data stream may be modified to include the requested statistics, and the user device may modify the display by rendering the scene to include the statistics.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "image" refers to a digital image or collection of images, captured by a camera. The image may be a still image, a video feed, a live photo, and the like. In one or more embodiments, the term "image" may additionally include stereo images or multi-camera images.

Referring to FIG. 1, a simplified diagram of a network for providing a virtual view is depicted, in accordance with one or more embodiments of the disclosure. The network may include a virtual display computing device 100. In one or more embodiments, virtual display computing device 100 may also be part of a server. Virtual display computing device 100 may be connected to other network devices across a network, such as client device 105.

According to one or more embodiments, virtual display computing device 100 may include a processor or processors, such as central processing unit (CPU) 120, and memory 115 connected over a bus. In one or more embodiments, the various components may connected over a communication network. Processor 130 may be a system-on-chip such as those found in mobile devices and include one or more dedicated graphics processing units (GPUs). Further, processor 130 may include multiple processors of the same or different type.

Memory 115 may each include one or more different types of memory, which may be used for performing device functions in conjunction with CPU 120. Memory 115 may include cache, ROM, and/or RAM. Memory 115 may store various programming modules during execution, including stream generation module 125 and model generation module 130. In one or more embodiments, view stream generation module 125 may be configured to generate a data stream for rendering and displaying by a client device 105. Model generation module 130 may be configured to generate models of objects in a scene captured and streamed by model generation module 130.

Virtual display computing device 100 may be operatively connected to one or more camera devices 110. Camera device 110 may each include an image sensor, a lens stack, and other components that may be used by a camera 155 to capture images. Camera device 110 may include typical cameras with a single lens stack and sensor, or may each include multi-camera systems, such as stereo cameras. In addition, camera device 110 may include a combination of different types of camera devices. Camera 155 may include a lens stack and a sensor, multiple lens stacks and a single sensor, or multiple lens stacks and multiple sensors. Camera device 110 may include additional sensors 160. Additional sensors 160 may be used to collect information regarding the context of the environment in which the camera device 110 is situated.

In one or more embodiments, virtual display computing device 100 may be operatively connected to a client device 105. In one or more embodiments, client device 105 may be a user device, from which a user interacts with the view generation module 125 to request and receive a virtual view of a scene. Client device 105 may be part of a multifunctional device, such as a mobile phone, tablet computer, personal digital assistant, portable music/video player, laptop, or desktop computer. In one or more embodiments, client device 105 includes a processor, such as CPU 140, and a memory 135, connected over a bus. Processor 140 may be a system-on-chip such as those found in mobile devices and include one or more dedicated graphics processing units (GPUs). Further processor 140 may include multiple processors of the same or different type.

Memory 135 may each include one or more different types of memory, which may be used for performing device functions in conjunction with CPU 140. Memory 135 may include cache, ROM, and/or RAM. Memory 135 may store various programming modules during execution, including rendering engine 150 and display user interface 155. Rendering engine 150 may include a graphics API that allows client device 105 to render 2D and/or 3D graphics and/or animation. In one or more embodiments, rendering engine 150 may include OpenGL, Metal, or SpriteKit. (OPENGL is a registered trademark of Silicon Graphics International Corp., SPRITEKIT is a registered trademark of Apple, Inc.)

Display user interface 155 may provide an interface for a user of client device 105 to utilize the stream generation module 125. In one or more embodiments, display user interface 155 may be a standalone application that provides an interface such as a graphical user interface (GUI) allowing a user to request to view a scene from a particular point of view or zoom, or to allow the user to track a particular object. In one or more embodiments, display user interface 155 may also be a web browser, or the like, which provides communicable connectivity between the client device 105 and the virtual display computing device 100. According to one or more embodiments, client device 105 may also include a display 145. Display 145 may be any kind of display device, such as an LCD display, LED display, OLED display, or the like. In addition, display 145 could be a semi-opaque display, such as a heads up display or the like. Further, in one or more embodiments, display 145 may include circuitry to provide a retinal projection. In one or more embodiments, display 145 may display or project the virtual view provided by the virtual display computing device 100.

Although virtual display computing device 100 and client device 105 are depicted as comprising the numerous components described above, in one or more embodiments, the various components may be distributed across multiple devices. Further, additional components may be used, some combination of the functionality of any of the components may be combined.

Figure 2:
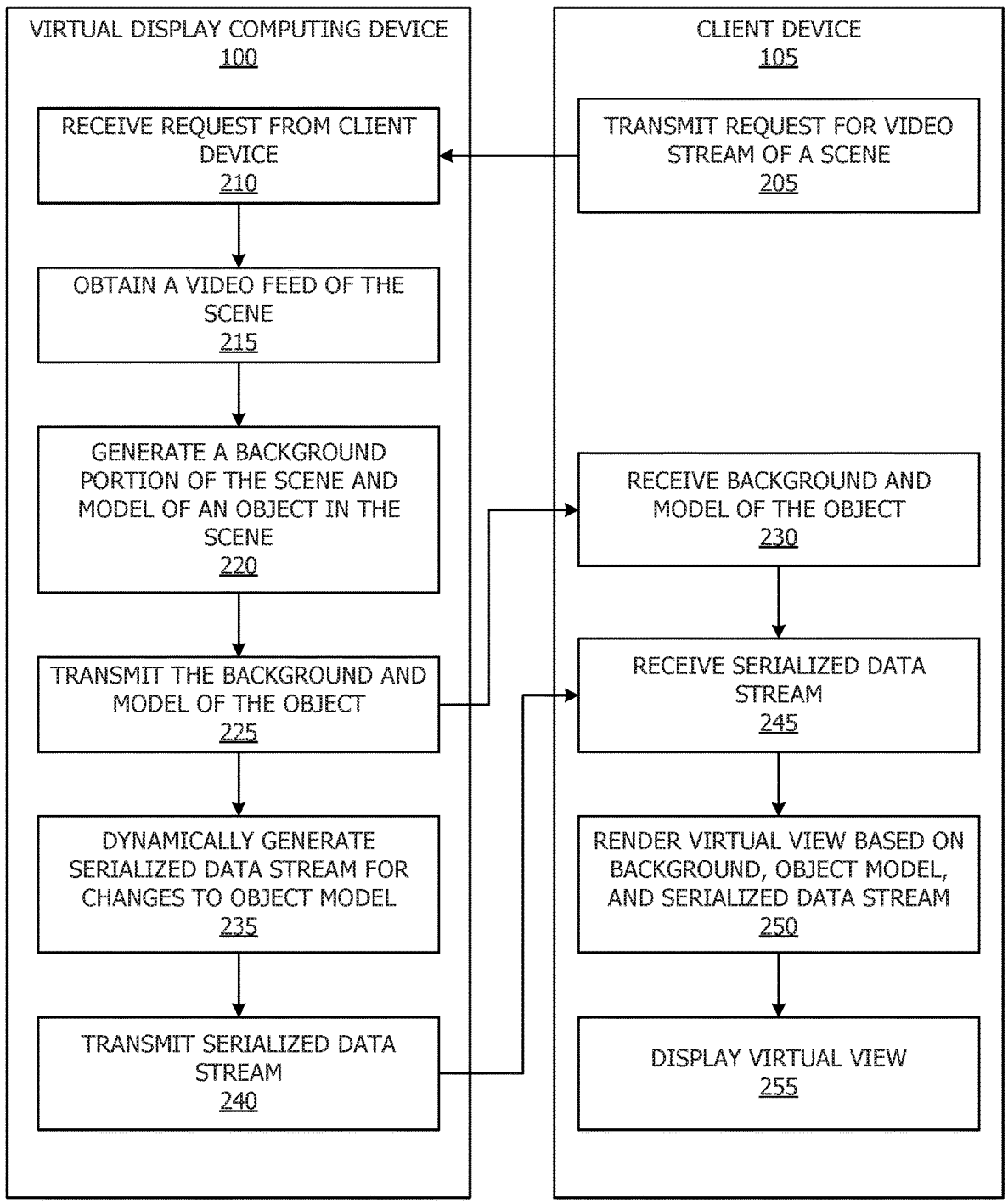
FIG. 2 shows, in flow chart form, an example method for providing a virtual view of a real environment, according to one or more embodiments.

FIG. 2 shows, in flow chart form, a method for providing a serialized data stream for a virtual view of a scene according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flow chart begins at 205 when client device 105 transmits a request for a video stream of a scene. For example, in one or more embodiments, a user may utilize display user interface 155 to request a video stream. In one or more embodiments, the request may be a request for a live stream, such as a sports event or performance event. According to one or more embodiments, the request may also indicate a capability of the client device 105 to render an animated stream. For example, the request may be transmitted for a particular stream along with an indication of APIs included in the client device 105, such as rendering engine 150.

The flow chart continues at 210, where virtual display computing device 100 receives the request from the client device. At 215, the virtual display computing device may obtain a video feed of the scene. For example, in one or more embodiments, the virtual display computing device 100 may obtain a live feed from camera device 100. In one or more embodiments, virtual display computing device 100 may additionally, or alternatively, receive data regarding a scene from multiple camera devices, or from other sources, such as external servers or other sensors.

The flow chart continues at 220 where the virtual display computing device identifies a background portion of a scene and generates artwork for the background portion and a model of an object in the scene. In one or more embodiments, the background portion may be any portion of the scene which changes at a rate slower than the object. Thus, the background portion may be any portion of the scene. In one or more embodiments, the object may be any object or person in the scene which moves at a rate faster than the background. In one or more embodiments, the virtual display computing device 100 may obtain the object model from an external server. At 225, the virtual display computing device 100 transmits the background and the model of the object to the client device 105. The background and model of the object may be received by the client device 105 at 230. In one or more embodiments, the virtual display computing device 100 may cause the client device 105 to check to see if a model of the object is available. Further in one or more embodiments of the invention, the virtual display computing device 100 may direct the client device 105 to identify a model which the client device 105 is to request from a remote source. As an example, if the client device 105 is requesting a data stream of a live football game, it may be possible that the virtual display computing device 100 directs the client device 105 to obtain a model of the individual football players from a third party store, or the virtual display computing device may directly provide the model of the individual football players to the client device 105. Similarly, the virtual display computing device 100 may directly provide the background of a scene, such as a particular football stadium, or may direct the client device 105 to obtain the background art from a third party source. Client device 105 may check to see that the model or background is available locally prior to requesting the model and background art from a third party source.

The flow chart continues at 235 where the virtual display computing device 100 dynamically generates a serialized data stream for changes to the object model. In one or more embodiments, the stream generation module 125 may generate the serialized data stream based on the capabilities of the client device 105. In one or more embodiments, the stream generation module 125 may generate the serialized data stream based on changes in the scene from the original background and model of the object sent to the client device 105. Returning to the example of a live football game, the serialized data stream may include indications of movement of the various objects. For example, the serialized data may indicate how the players and ball moves down the field, but does not include the actual images of the players, or the ball. Further, the serialized data stream may not include images of the background. At 240, the virtual display computing device 100 transmits the serialized data stream to the client device 105.

The flow chart continues at 245, and the client device 105 receives the serialized data stream. The flow chart continues at 250 where the client device 105 renders the virtual view based on the received background, object model, and serialized data stream. In one or more embodiments, the rendering engine 150 may generate a virtual view of the video. As an example, while a live football game is occurring, the rendering engine 150 may generate a virtual video of the live event using the background (i.e., the football field art), the models of the objects (i.e., the models of the players and the ball), and the serialized data that indicates the movement of the objects on the background. The flow chart continues at 255 where the client device 105 displays the virtual view.

In one or more embodiments, the rendering engine 150 may additionally occasionally receive updates to the background data. As an example, if the lighting over the field changes, or if the look of the crowd changes, an updated background may be transmitted from the virtual display computing device 100 to the client device 105. As another example, the background may change if the conditions of the field change. Further, as another example, if a user is streaming a live performance, a background may actually change, such as in a play. Similarly, in one or more embodiments, the client device 105 may additionally receive updated models of the objects. For example, over time, a football player may have a torn uniform. In one or more embodiments, the virtual display computing device 100 may monitor the video feed of the live event to determine whether a change in the background or the object model is required. For example, the model generation module 130 may monitor the background and/or an object to determine whether a difference between the original model or background and a current model or background has satisfied a threshold. In response to determining that the difference satisfies a threshold, the virtual display computing device 100 may transmit the updated background or model to the client device 105. According to one or more embodiments, upon receiving updated background art, or an updated model of an object, the rendering module 150 may utilize the new data in conjunction with the serialized data stream in order to generate an updated virtual view.

According to one or more embodiments, by streaming a serialized data stream rather than the actual video stream, a significant amount of bandwidth may be saved. Further, the use of streamed serialized data allows for additional user personalization not normally provided by a traditional live video stream. As an example, if the user is streaming a virtual view of a baseball game, the user may request statistics about a particular team or player. Those statistics may be streamed along with the differential of the object model as part of the serialized data such that the client data 105 may render the virtual view with a display of the statistics. As another example, a user of the client device may be streaming a live acting performance, and request information regarding an actor or the performance. The requested information may be transmitted as part of the serialized data stream.

Figure 3:
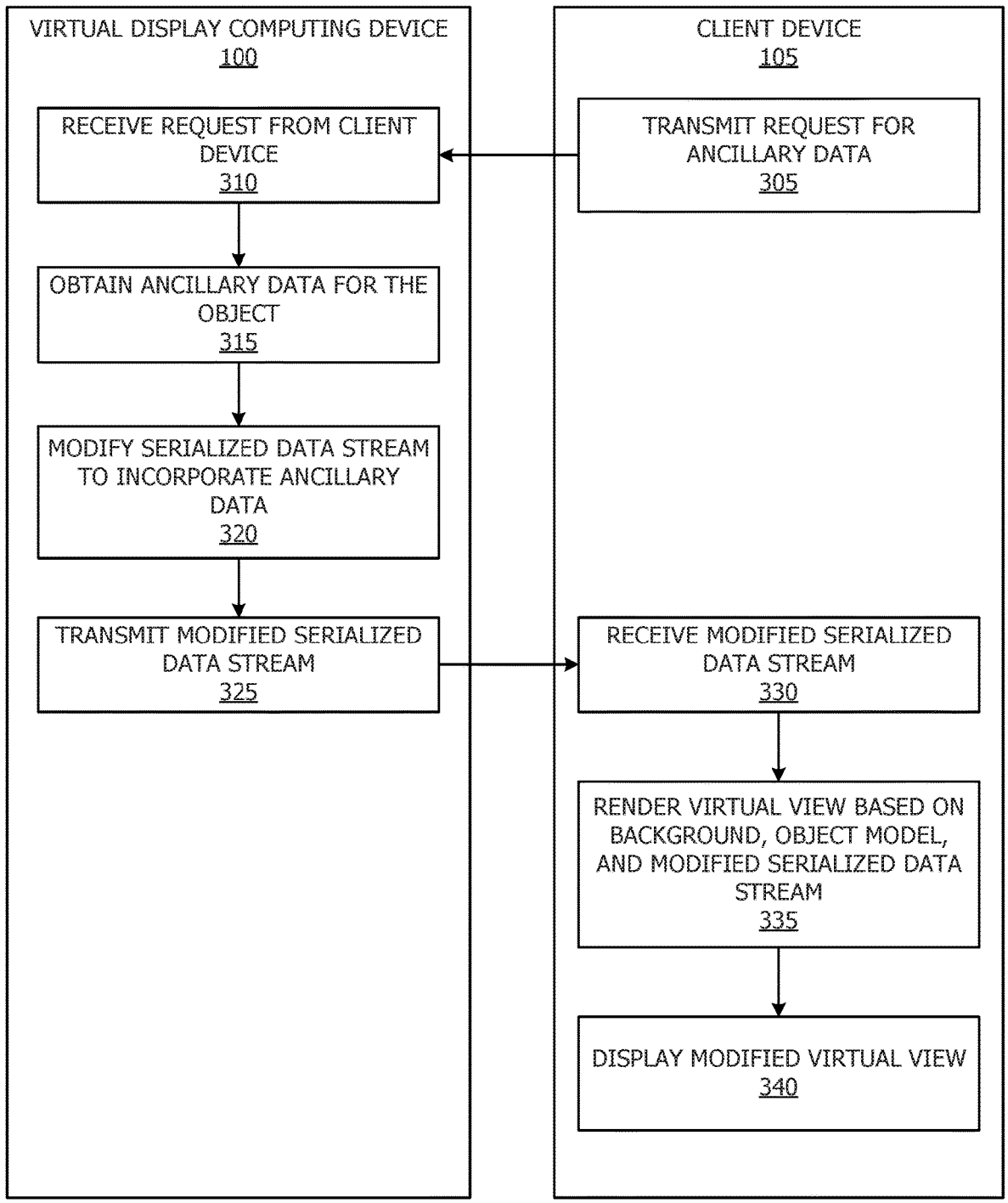
FIG. 3 shows, in flow chart form, a method for synthesizing a virtual view in accordance with one or more embodiments.

Referring now to FIG. 3, FIG. 3 shows, in flow chart form, a method for synthesizing a virtual view in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added. In one or more embodiments of the invention, one or more of the various actions depicted as being conducted by the virtual display computing device 100 or the client device 105 may be taken by another third party, such as a remote server.

The flow chart begins at 305 when the client device 105 transmits a request for ancillary data. In one or more embodiments, the ancillary data may include any data not originally included in the serialized data stream, or the transmission of the backgrounds or models. According to one or more embodiments, the ancillary data may be associated with an object, or may be associated with the event being streamed.

The flow chart continues at 310 where the virtual display computing device 100 receives the request from the client device 105. At 315 the virtual display computing device 100 obtains the requested ancillary data. In one or more embodiments, the ancillary data may be data generated locally by the virtual display computing device 100, or may be obtained from a third party device. As an example, the ancillary data may include statistics or other information about a sporting event. As another example, the ancillary data may include other information related to a streamed event (e.g., the words being spoken or sung during a play or opera).

The flow chart continues at 320 where the virtual display computing device 100 modifies the serialized data stream to incorporate the ancillary data. That is, in one or more embodiments, the virtual display computing device 100 may add the ancillary data to the serialized data stream. The virtual display computing device 100 may include additional data indicating how the ancillary data should be rendered. The modified serialized data stream may be dynamically generated to include the updated movements of the object, as well as the ancillary data. At 325, and the virtual display computing device 100 transmits the modified serialized data stream.

The flow chart continues at 330 where the client device 105 receives the modified serialized data stream. Then, at 335, the client device 105 may render the virtual view based on the background, object model, and modified serialized data stream. Thus, the newly rendered virtual view may include the requested data, along with a virtual view of the event. At 340 the client device 105 displays the modified virtual view. According to one or more embodiments, the client device 105 displays the modified virtual view on the display 145.

Figure 4:
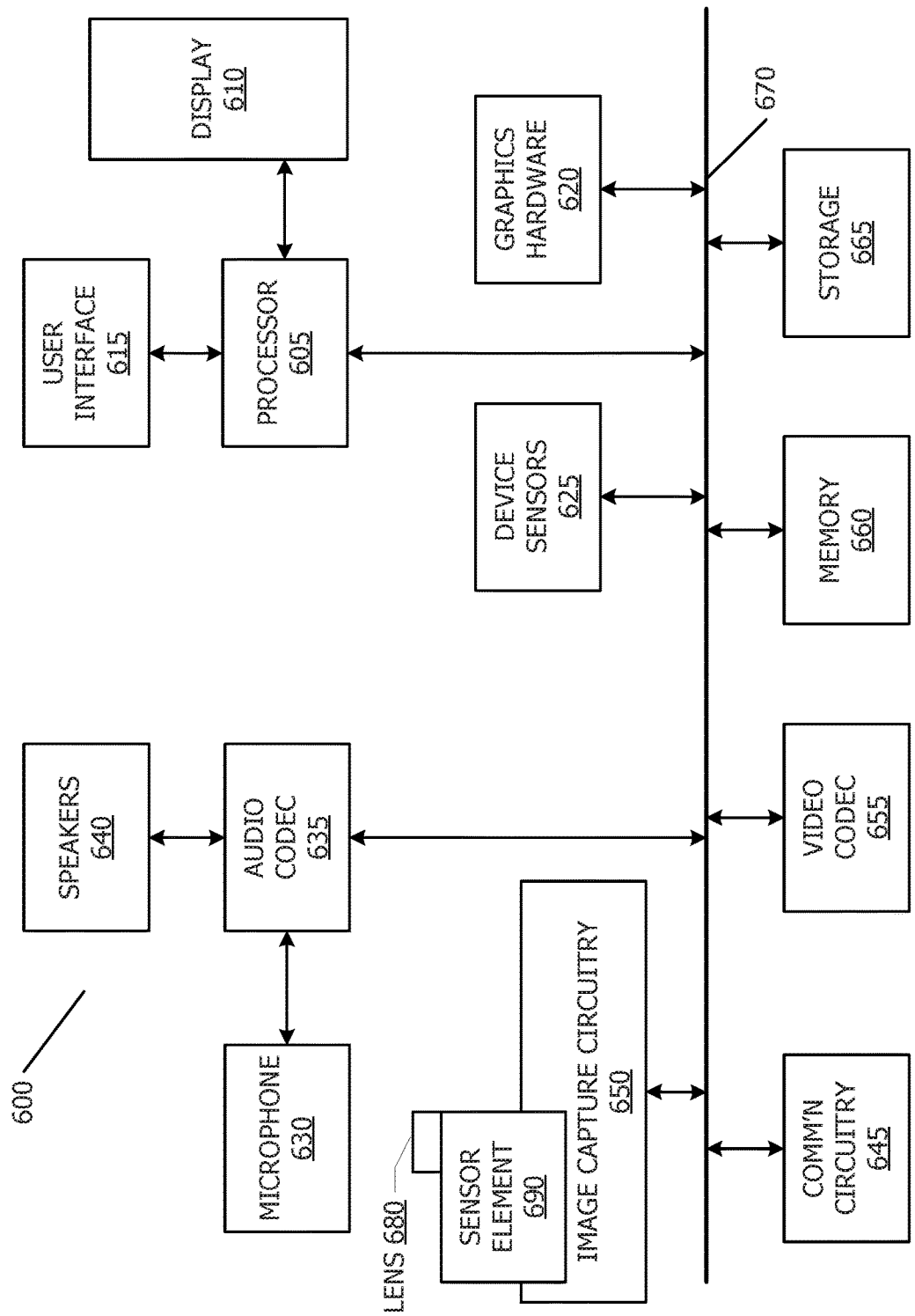
FIG. 4 shows, in block diagram form, a simplified multifunctional device according to one or more embodiments.

Referring now to FIG. 4, a simplified functional block diagram of illustrative electronic device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 110) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680, where each lens assembly may have a separate focal length. The lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 665 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for streaming image data, comprising:
receiving a request for a video stream of a scene of a live event;
identifying a background portion of the scene;
obtaining background art corresponding to the background portion of the scene;
obtaining a model of an object in the scene;
transmitting the background art and the model of the object;
generating, as the object moves during the live event, a data stream indicating how the object moves; and
transmitting the data stream for the object,
wherein the data stream does not contain the background portion of the scene and does not contain the model of the object, and wherein a representation of the live event is generatable from the transmitted background art, the model of the object, and, wherein a dynamic representation of the object in the representation of the live event is generated based on the model of the object and according to the data stream indicating how the object moves.

2. The method of claim 1, wherein the data stream comprises indications of changes in an object shape from an initial transmission.

3. The method of claim 1, wherein the data stream indicating how the object moves comprises location information.

4. The method of claim 1, wherein the data stream further comprises ancillary data corresponding to the object.

5. The method of claim 1, wherein the object comprises an athlete or an athletic object.

6. The method of claim 1 further comprising:
identifying a change in the background art in the live event;
generating an updated background art; and
transmitting the updated background art.

7. The method of claim 1, wherein the background portion comprises a portion of the scene that changes at a rate slower than the object in the scene.

8. A system for streaming image data, comprising:
one or more processors; and
one or more memory devices comprising instructions executable by the one or more processors to cause the system to:
receive a request for a video stream of a scene of a live event;
identify a background portion of the scene;
obtain background art corresponding to the background portion of the scene;
obtain a model of an object in the scene;
transmit the background art and the model of the object;
generate, as the object moves during the live event, a data stream indicating how the object moves,
wherein the data stream does not contain the background portion of the scene and does not contain the model of the object, and wherein a representation of the live event is generatable from the transmitted background art, the model of the object, and, wherein a dynamic representation of the object in the representation of the live event is generated based on the model of the object and according to the data stream indicating how the object moves.

9. The system of claim 8, wherein the data stream comprises indications of changes in an object shape from an initial transmission.

10. The system of claim 8, wherein the data stream indicating how the object moves comprises location information.

11. The system of claim 8, wherein the data stream further comprises ancillary data corresponding to the object.

12. The system of claim 8, wherein the object comprises an athlete or an athletic object.

13. The system of claim 8, further comprising instructions to cause the system to:
identify a change in the background art in the live event;
generate an updated background art; and
transmit the updated background art.

14. A non-transitory computer readable medium comprising computer readable code executable by one or more processors to cause the one or more processors to:

receive a request for a video stream of a scene of a live event;
identify a background portion of the scene;
obtain background art corresponding to the background portion of the scene;
obtain a model of an object in the scene;
transmit the background art and the model of the object;
generate, as the object moves during the live event, a data stream indicating how the object moves,
wherein the data stream does not contain the background portion of the scene and does not contain the model of the object, and wherein a representation of the live event is generatable from the transmitted background art, the model of the object, and, wherein a dynamic representation of the object in the representation of the live event is generated based on the model of the object and according to the data stream indicating how the object moves.

15. The non-transitory computer readable medium of claim 14, wherein the data stream comprises indications of changes in an object shape from an initial transmission.

16. The non-transitory computer readable medium of claim 14, wherein the data stream indicating how the object moves comprises location information.

17. The non-transitory computer readable medium of claim 14, wherein the data stream further comprises ancillary data corresponding to the object.

18. The non-transitory computer readable medium of claim 14, wherein the object comprises an athlete or an athletic object.

19. The non-transitory computer readable medium of claim 14, further comprising computer readable code executable by one or more processors to:
identify a change in the background art in the live event;
generate an updated background art; and
transmit the updated background art.

20. A non-transitory computer readable medium comprising computer readable code executable by one or more processors to cause the one or more processors to:
transmit a request for video stream of a scene of a live event;
receive background art corresponding to a background portion of the scene;
receive a model of an object in the scene;
receive a data stream indicating a modification of the object from the model indicative of a movement of the object; and
render a virtual view of the scene based on the background art, the model of the object, and the data stream for the object,
wherein the data stream does not contain the background portion of the scene and does not contain the model of the object, and wherein a representation of the live event is generated from the transmitted background art, the model of the object, and, wherein a dynamic representation of the object in the representation of the live event is generated based on the model of the object and according to the data stream indicating how the object moves.

21. The non-transitory computer readable medium of claim 20, wherein characteristics of the object change more frequently than characteristics of the background portion.

* * * * *